United States Patent [19]

Woodgate

[11] Patent Number: 4,580,766
[45] Date of Patent: Apr. 8, 1986

[54] LINE OR NET HAULING APPARATUS

[76] Inventor: Brian F. Woodgate, 2 Penluke Close, Four Lanes, Redruth, England

[21] Appl. No.: 611,097

[22] Filed: May 17, 1984

[51] Int. Cl.[4] .................. B66D 1/30; A01K 73/00
[52] U.S. Cl. ........................................ 254/371; 43/8; 254/389
[58] Field of Search ............... 254/371, 382, 389, 372, 254/390, 279, 280, 281, 266; 43/8; 242/117; 226/193, 196

[56] References Cited

U.S. PATENT DOCUMENTS

| 571,033 | 11/1896 | Ahearn | 254/371 |
| 2,095,409 | 10/1937 | Deluchi et al. | 43/8 |
| 2,733,531 | 2/1956 | Puretic | 43/8 |
| 3,047,973 | 8/1962 | Puretic | 43/8 |
| 3,797,806 | 3/1974 | Demmert | 254/372 X |

FOREIGN PATENT DOCUMENTS 938819 10/1948 France .................. 254/389

Primary Examiner—Stuart S. Levy
Assistant Examiner—Katherine Jaekel
Attorney, Agent, or Firm—Gifford, VanOphem, Sheridan and Sprinkle

[57] ABSTRACT

Line or net hauling apparatus is disclosed comprising a drum having a cylindrical surface from which project a plurality of generally radially extending engagement members each having a first surface element at the cylindrical surface on the opposite side of a circumferential center line from that of the adjacent members to define a sinuous path for a flexible line or net wound on the drum; edge surface elements of the engagement members being inclined with respect to the diametral axial plane in which lies the said first surface element of the engagement member, the inclination of adjacent edge surface elements being in opposite directions from one another.

25 Claims, 8 Drawing Figures

LINE OR NET HAULING APPARATUS

BACKGROUND OF THE INVENTION

When large fishing nets are to be hauled into a boat it is necessary to use power assistance due to the substantial weight of fish which may be caught in the net. However, a number of problems in providing reliable net hauling apparatus have been encountered due to the particular problems associated with the fishing industry. A first of these problems is the highly corrosive nature of the salt water which inevitably comes into intimate contact with every moving part of the apparatus. Another problem is the very considerable change in shape of the net between its empty condition and its full condition so that net hauling apparatus which totally encloses the net as it is drawn cannot be satisfactory employed. Moreover, because of the relatively fragile nature of each element forming the loops of the net, it is not possible individually to engage these since any breakage of a filament would involve an increase in the net aperture size and would weaken the net substantially as well as providing an escape route for fish from the net thereby reducing its effectiveness.

OBJECTS OF THE INVENTION

A primary object of the invention is to provide net hauling apparatus which can act to haul a net whether it is full or empty.

A further object of the invention is to provide a net hauler which frictionally engages a part only of the net so that breakage of individual net filaments is avoided while changes in shape due to the presence of a quantity of fish do not detract from the effectiveness of the grip of the apparatus on a net.

Yet another object of the invention is to provide a net hauler of simple and robust construction which is more effective than the prior art haulers.

Still another object of the invention is to provide a net hauler which reliably acts to haul a multi monofilament net without windblown drift of the net carrying it out of engagement with the hauler, or worse, into a position where net filaments can become trapped in the working parts of the hauler.

SUMMARY OF THE INVENTION

The present invention provides line or net hauling apparatus comprising a rotatable member, a generally cylindrical surface on said rotatable member, a plurality of generally radially extending engagement members on said rotatable member, said engagement members having first surface elements such as to define a sinuous path around said cylindrical surface for a flexible member placed between them, and second surface elements defining two coaxial frusto-conical surfaces having a wide end and a narrow end, said coaxial frusto-conical elements being positioned with said narrow ends directed towards one another.

By defining a sinuous path for a flexible element it is possible to lay a line or net between the first surface elements in such a way that as the rotatable member is rotated the surface elements pass the line causing it to flex as they pass. Frictional engagement between the surface elements and the line can be increased, however, merely by applying a tension to the line, the degree of frictional engagement being related to the magnitude of the tension and the lateral excursions defined by the sinuous path. Thus if, in use, a line or net is placed over the cylindrical surface in contact with the first surface elements and passing around an arc of 90° or more, and the rotatable element caused to rotate, then the line can be displaced by hauling on it, for example manually, but when tension on the line is released the grip of the line hauling apparatus is correspondingly released so that hauling can be controlled easily by one or more operator. In heavy weather conditions when the boat may be rising or falling by substantial distances between each crest and trough of each wave the ability to haul periodically, as the boat descends from crest to trough and to stop hauling while the boat is rising from trough to crest is a considerable advantage.

The engagement members of the line hauling apparatus may be in the form of a plurality of fins each lying in a respective plane having a radial component of direction and an axial component of direction, the first and second surface elements being constituted by edge faces lying between two parallel major faces defining the plane of the fin.

In one alternative aspect of the invention, there is provided line or net hauling apparatus incorporating a rotatable member having a generally cylindrical surface and a plurality of generally radially extending engagement members each having a first surface element or edge positioned on the cylindrical surface on one side of a circumferential center line opposite that position occupied by the next adjacent members, and on the other side thereof from the member itself, and second surface elements lying generally perpendicular to the first surface elements.

Preferably the engagement members are fins extending generally radially from the cylindrical surface and the surface elements are orthogonal edges of the fins joined by curved corner sections. Each fin preferably lies in a radial plane extending at generally 45° to an intersecting radial plane passing through the axis of the cylindrical member and the fin itself.

The cylindrical surface is preferably formed as part of a drum having generally radially extending end flanges formed as frusto-conical surfaces with their narrow ends nearer one another and their wide ends remote from one another.

In a further alternative aspect, the line or net hauling apparatus comprises a rotatable member having a generally cylindrical surface from which extend a plurality of generally radially projecting arms spaced around the periphery of the cylindrical surface, each said arm comprising a first part which extends substantially normal to the cylindrical surface and a second part which is inclined with respect to a radial plane, the second parts of adjacent arms lying on opposite sides of a central radial plane.

This further alternative aspect of the invention is related to the first in that the arms can be considered as corresponding to the engagement members, the first and second parts of the arms corresponding to the first and second surface elements of the engagement members.

In one embodiment of the invention each arm has a third part lying at a greater angle to the said central radial plane than the said second part.

It will be appreciated that the said second parts of the array of arms lie in two frusto-conical surfaces which are coaxial and have their narrow ends directed towards one another.

The radially outer end of each arm may be free and unsupported if the arms themselves (or the fins in the case of the first aspect of the invention) are sufficiently rigid to take the strain imposed upon them in use. In a practical embodiment, however, each arm is supported against movement with respect to the cylindrical surface by a rigid support element of the rotatable member projecting radially therefrom. Such rigid support element is preferably a generally disc-like support element extending radially from the cylindrical surface and conveniently, such support element is dished or substantially frusto-conical in form with the wider ends spaced axially away from the central radial plane of the apparatus.

In order to define the said sinuous path the first part of each arm may lie on the central radial plane, in which case the line must be curved in zig-zag form to pass on opposite sides of adjacent arms. To increase the effectiveness of the apparatus, however, the first parts of adjacent arms may be spaced axially from a central radial plane passing through the cylindrical surface. Each arm may thus be positioned such that its first part lies on the opposite side of the central radial plane from that on which its second part lies. A line following a sinuous path around the first parts of the arms is thus flexed more sharply at each bend than if the first parts of the arms all lie in a radial plane. The axial offset of each first part of adjacent arms is preferably approximately the same as the thickness of the first part of the arm itself.

The cylindrical surface and the said disc-like support elements are conveniently secured together to constitute the said rotatable member for example in the form of a drum, and this latter may also include a shaft borne in plain bearings in a cradle which is turnable about an upright axis.

Preferably the drum is made as a unitary casting from a suitable metal and the cylindrical surface is supported by a single radial web from a central shaft borne at its ends in the said plain bearings, while the frusto-conical end flanges are supported by generally radially extending reinforcement webs extending from the shaft to the frusto-conical surface itself.

The cradle may form part of a frame incorporating a net guide loop lying in a plane parallel to the axis of the cylindrical surface but displaced therefrom in a direction transverse the axis. Such a net guide loop is shaped such that a net being hauled is guided into contact with the arms as the net is being hauled by the apparatus. The presence of such a loop is important when nets of the so-called multi-monofilament type are employed in which each net loop or bar is made from a plurality of monofilament lines. Such nets do not hold water so that in a space between the surface of the sea and the gunwales of the boat (at which latter location the net hauling apparatus is expected to be fitted), that is a distance determined by the freeboard of the boat, the net dries substantially and can be blown by the wind because of its relative lightness. However, since the net may carry a considerably bulk of fish which will not pass through the relatively restricted space of a net guide loop, it is preferred that the net guide loop includes an opening which is closable by a closure member. Since the boat will normally be faced into wind when net hauling takes place, the direction of the wind in relation to the net hauling apparatus is fixed, and the net guide loop is preferably formed to an asymmetrical shape, incorporating a substantially linear portion inclined at an acute angle to a line parallel with the axis of the rotatable member of the net hauling apparatus with the acute angle facing into the wind. The opening in the loop is formed in this linear portion at or adjacent to the down wind end of the loop so that, in use, the net is naturally blown towards the opening. The closure may be a cylindrical at least partly resilient sleeve which can be fitted over the rod or tube forming the loop.

Preferably, in use of the apparatus, the net passes in contact with the rotatable member over an arc in the region of 180°, and to prevent the net from circling the member and becoming wound on it, a rear guard is preferably provided opposite the net guide loop and constituted by an axially extending member laterally displaced from the plane of the net guide loop.

The features and advantages of the invention will become apparent from a study of the following description in which reference is made to the accompanying drawings, provided purely by way of non-limiting example.

DESCRIPTION OF THE PREFERRED EMBODIMENTS

Figure 1:
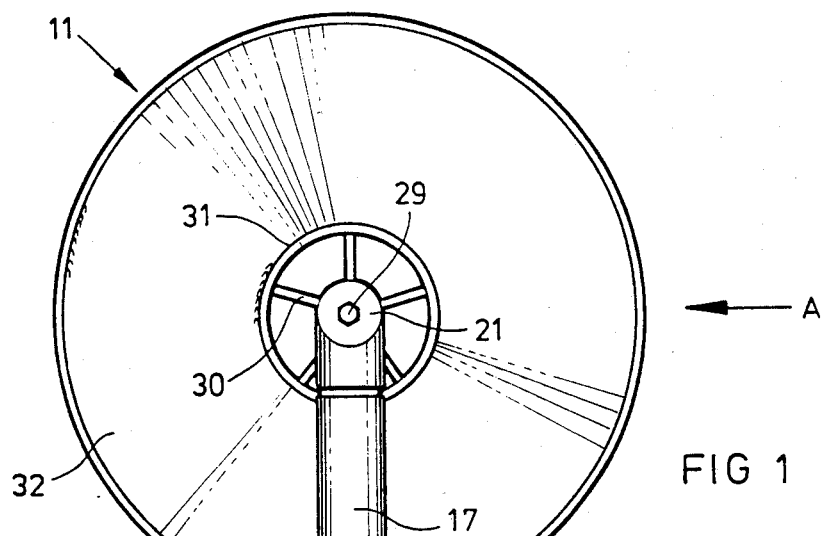
FIG. 1 is a side view of a net hauling apparatus formed as a first embodiment of the present invention.

Referring now to the drawings, the net-hauling apparatus shown comprises a rotatable drum generally indicated 11 mounted on a cradle generally indicated 12 which in turn is mounted on an upright pillar 13 which may be fixed or may be turnable about a vertical axis parallel to its length. The cradle 12 is joined to the pillar 13 by an arcuate section 14 and a reinforcing strut 15 is provided for rigidity. The cradle 12 itself comprises a generally horizontal beam 16 at each end of which is an upright arm 17,18 joined to the beam 16 by curved sections 19,20. These components are secured together as by welding and are conveniently made as illustrated from large diameter tubular steel which may be galvanized or otherwise protected from the corrosion by salt water.

Figure 3:
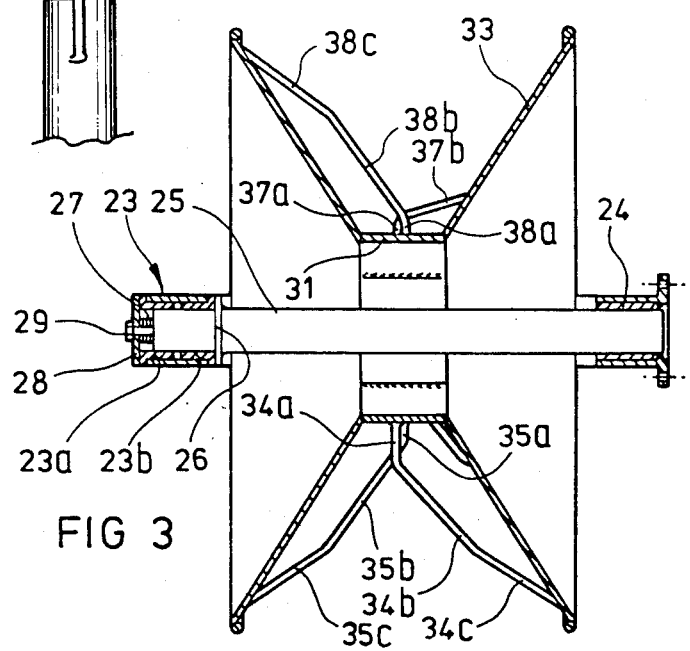
FIG. 3 is a sectional view taken on the line III—III of FIG. 2.

At the upper end of each of the arms 17,18 is a stub of reduced diameter over which fits a respective bearing cap 21,22 containing plain bearing bushings 23,24 (see FIG. 3) supporting a central rotatable shaft 25. The bearing bushing 24 is formed simply as a plain sleeve while the bearing bushing 23 is formed as two flanged sleeves 23a,23b. The shaft 25 has a flange 26 which engages the flanged bushing 23b and end float on the shaft 25 is accommodated by means of a plurality of shims 27 trapped between the end of the shaft and an end cover 28 screwed to the shaft 25 by a bolt 29. Simple adjustment to the shims 27, by replacing or adding shims of different thickness, can be effected after removing the bolt 29.

Extending radially from a central portion of the shaft 25 are five radial flat spokes 30 carrying a cylindrical drum 31 from each end of which projects a frusto-conical support element 32,33. The assembly comprising the drum 31 and the two frusto-conical elements 32,33 constitute a structure corresponding approximately to that of a V-groove pulley.

Extending radially out from the drum 31 are ten arms indicated individually by the reference numbers 34–43. The arms 34–43 are separated into two groups of five, individual arms from each group being intercalated with arms from the other group so that arms belonging to the first group are identified with even reference numerals and arms belonging to the second group are identified with odd reference numerals. Each arm is composed of three parts identified with a,b and c. The first part, identified with the a extends substantially radially, and this first part of each arm is offset by the thickness of the arm from a central diametral plane X—X.

Figure 4:
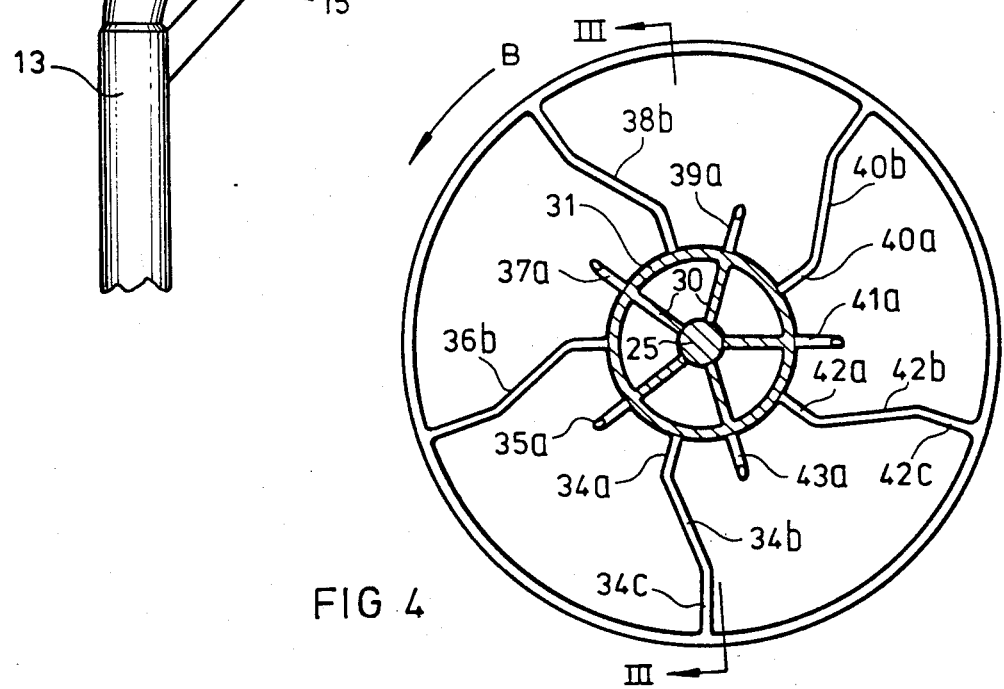
FIG. 4 is a sectional view taken on the line IV—IV of FIG. 2.

The arms of each set are identical and consequently will be described hereinbelow with reference to one of the arms, namely the arm 34. The first part 34a of the arm 34 extends substantially radially and is located to the left of the central plane X—X as viewed in FIG. 2. The second part 34b of the arm 34 is bent and extends to the right in FIG. 2 and, as viewed in FIG. 4, also has a peripheral component of direction so that the radially outer end of the part 34b is positioned more forwardly, in the direction of rotation of the drum (as indicated by the arrow B in FIG. 4) than the radially inner end of the part 34b. Finally, the third part 34c of the arm 34 extends between the part 34b and the rim of the frusto-conical support member 33 and lies in a substantially axial plane.

Figure 2:
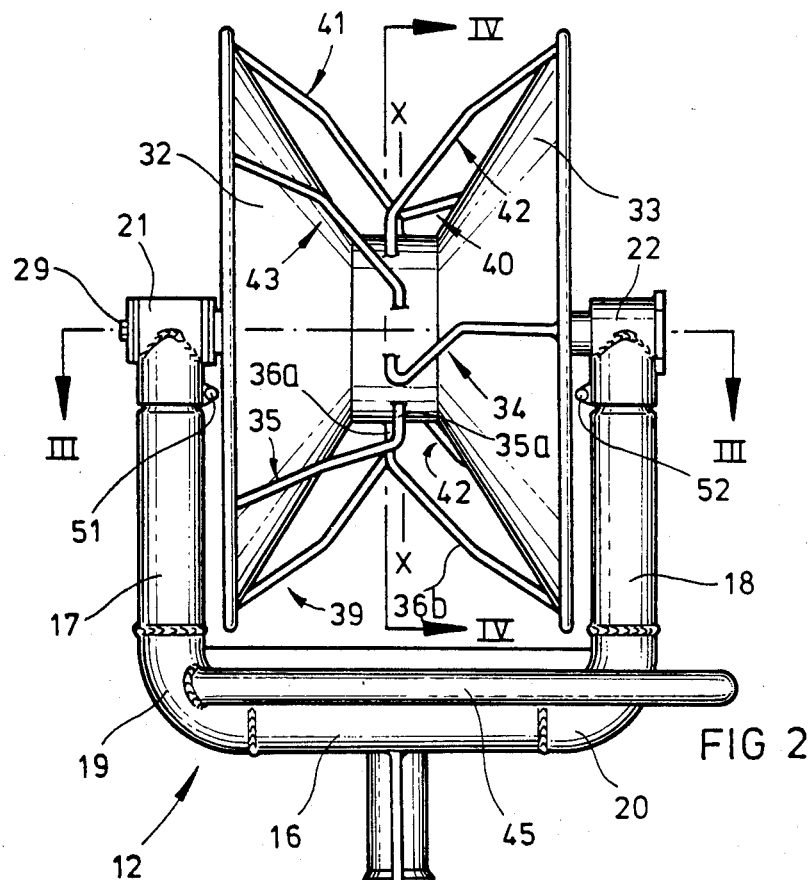
FIG. 2 is a front view, in the direction of the arrow A of FIG. 1.

As can be seen in FIG. 2, the first part 34a of the arm 34 lies on the opposite side of the central diametral plane X—X from the second part 34b and the third part 34c, and the adjacent arms 35 and 43 lie on the opposite side of the plane X—X and extend in the opposite direction from the arm 34. The first parts of the arms, that is the parts identified with the a thus constitute guide means defining a sinuous path around the drum 31 for a line or a net and the second and third parts define a double conical receiving cage for guiding the bulk of a net drawn by a line or that part of a net closely in contact with the drum 31 and therefore engaged with contact by the first part a of the arms.

Figure 5:
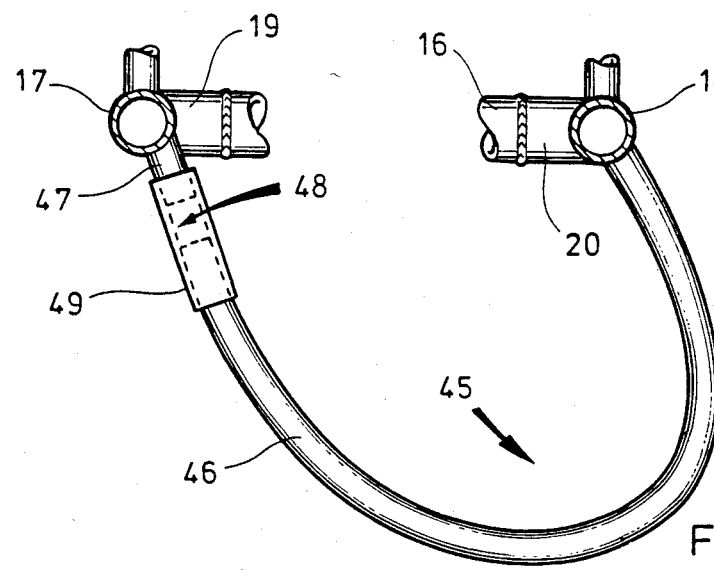
FIG. 5 is a plan view from above of the net guide loop of the embodiment of FIG. 1.

Spanning the two right angle curved sections 19, 20 of the cradle 12 is a net guide loop 45 which is formed in two parts as can be seen in FIG. 5, namely a major loop part 46 and a short stub 47 which is spaced from the major loop part by a gap 48 on the down wind side of the loop 45. A sleeve 49 of slightly resilient material spans the gap 48 and the stub 47 is slightly misaligned with respect to the adjacent section of the loop 46 so that the sleeve 49 is free to slide on the arm 46 but is secured by flexural distortion as it is fitted over the stud 47. In use the net passes through the loop 45 but should the net contain any large objects such as buoys or fish too large to fish through the loop 45 the sleeve 49 can be pulled outwardly away from the upright arm 17 to allow the net to be drawn through the opening 48 to allow the object to pass the loop 45 and the net can then be reintroduced through the opening 48 and the sleeve 49 pushed back into the position in which it is illustrated in FIG. 5. As can be seen in FIG. 1, a guide 50 is provided on the rear of the drum to prevent the net from being carried round by the arms and coiled around the drum. The guide 50 acts in this way as a separator causing the net to be pulled out from the gap between adjacent arms.

It is to be noted that the whole structure of the net hauling mechanism is simple and does not require any sophisticated or delicate components. Even the bearings 23, 24 are plain bearings and may be self-lubricating or lubricated by means of grease nipples (not shown) mounted on the bearing caps 21, 22. By using graphited plastics bearing material the bearings are substantially self-aligning, this being assisted by the pivotal mounting of the bearing caps 21, 22 on the upper ends of the arms 17, 18 of the cradle to which they are clamped by clamping screws 51, 52 as shown in FIG. 2. By releasing these clamping screws 51, 52 the bearing caps 21, 22 can be removed to separate the whole of the drum assembly from the cradle, and by then removing the set bolt 29 the bearing caps can be separated from the shaft 25 for removal or adjustment of the bearing bushings 23, 24. Although not illustrated the shaft 25 has a splined or keyed axial opening in the end remote from the flange 26 to accept a drive coupling from any suitable drive motor.

As mentioned above, the arms 34–43 may be replaced by radial fins having edge surfaces the shape of which conforms substantially to that of the arms themselves.

Figure 6:
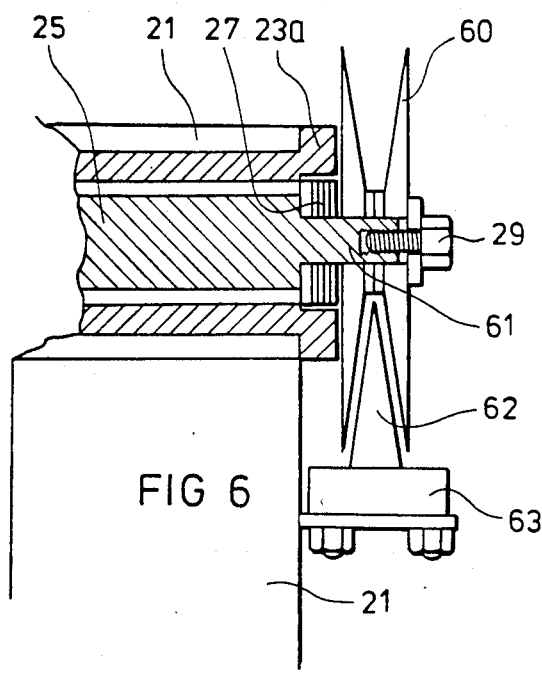
FIG. 6 is a partial sectional view of a modification of the embodiment of FIGS. 1 to 5.

Referring now to FIG. 6 the sectional view shown illustrates a modification of the embodiment of FIGS. 1 to 5 in which a V-groove pulley 60 is fitted on to an axial spigot 61 projecting from the end of the shaft 25. This end of the shaft 25 is carried in a pair of bushings 23a, 23b (of which only the bush 23a is visible in FIG. 6) supported in a bearing cap 21, where the reference numerals for identical or corresponding components with the embodiments of FIGS. 1 to 5 are the same. A set of shims 27 is interposed between the pulley 60 and the end flange of the bushing 23a and the pulley 60 is held in position clamped against these shims 27 by a set screw 29 screwed into a threaded hole in the end of the spigot 61 in the end of the shaft 25. Suitable adjustment of the shims 27 can be made to ensure a very small working clearance between the flanged bushing 23a and the pulley 60, and such adjustments can be made readily, even by unskilled personnel, in the event of wear to compensate for dimensional changes.

A clearing "knife" in the form of a triangular blade 62 closely follows the inner contour of the V-groove pulley 60 and is mounted on a bracket 63 carried on the bearing cap 21. The pulley 60 is used as an additional hauling mechanism for individual lines when the so-called "long line" fishing method is used, in which a substantial length of line is fitted with a plurality of transverse branches called "snoods" each carrying an individual hook or collection of hooks. Such lines may be several thousand yards long and, because of the presence of the snoods with hooks, it is not desirable for them to be carried in the sinuous path provided by the arms of the main hauling device. The knife 62 prevents wrap around of the line and acts to clear the pulley 60 from any tendency of the line to become snagged or engaged in the groove of the pulley.

Figure 7:
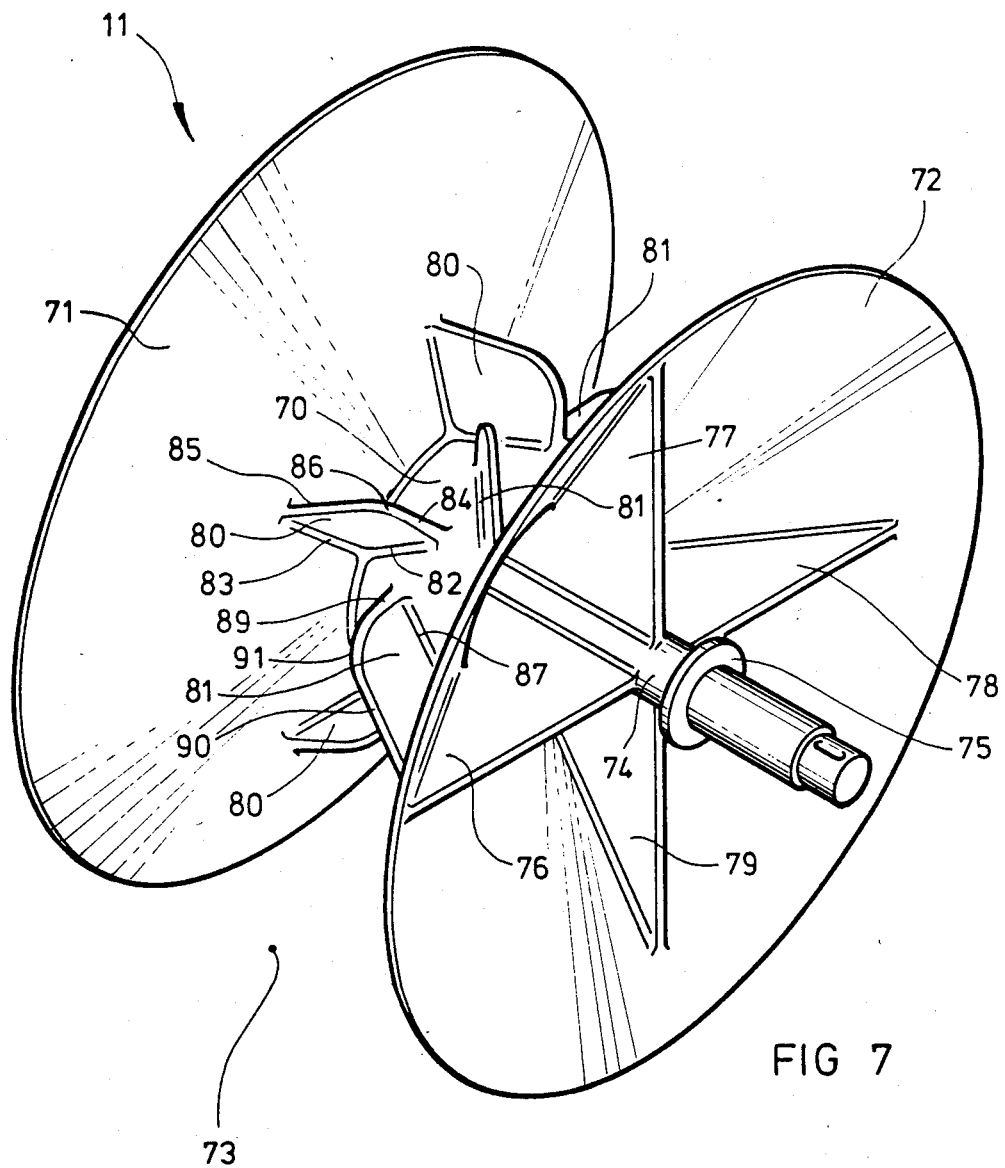
FIG. 7 is a perspective view of a drum forming part of the line hauling apparatus of a further embodiment of the invention.

The drum illustrated in FIG. 7 is generally indicated with the reference numeral 11 and comprises a generally cylindrical surface 70 at each end of which is a frusto-conical end flange 71,72 respectively. The end flanges are of substantially greater radial dimension than the cylindrical surface 70, for example two or three times greater, and define between them and the cylindrical surface 70 itself an annular space generally indicated 73.

The drum comprising the cylindrical surface 70 and end flanges 71,72 may be fabricated from sheet steel or, preferably, cast integrally from a suitable material such as an aluminium alloy. The cylindrical surface 70 is supported by a single central radial web (not shown) pierced by an axially extending shaft 74 the end of which carries a thrust bearing washer 75 and is adapted to be housed in a plane bearing (not shown) similar to that described and illustrated in my earlier patent application No. 82 28870. Extending in orthogonal radial planes from the shaft 74 to the frusto-conical flanges 71, 72 are respective sets of reinforcing fins 76,77,78,79 which extend radially outwardly through a substantial portion of the radius of flange 71,72 itself.

In the annular space 73 defined by the frusto-conical flanges 71,72 are located a plurality of fins 80,81. The fins 80 are all identical to one another and the fins 81 are all identical to one another and only one pair of fins will therefore be described in detail. Each fin 80 lies in a radial plane at 45° to a radial plane passing through the shaft 74 and has two edges 82, 83 respectively attached to the cylindrical surface 70 and the adjacent frusto-conical surface 71. Two further edges 84,85 constitute free edges of the fin 80, the former extending in a radial direction from the shaft 74 and the latter lying generally perpendicularly with respect to the former and joined by a curved corner section 86. The radial edge 84 of the fin lies on the opposite sides of a circumferential center line of the cylindrical surface 70 from the major part of the fin 80. Likewise, the fins 81 each comprise edges 87,88 attached to the cylindrical surface 70 and the frusto-conical surface 72 respectively (although the edge 88 is not in fact visible in the drawing) and two free edges 89,90 joined by a curved corner section 91.

Again, the radial edge 89 extends orthogonally with respect to the shaft 74 and lies on the other side of the center line passing circumferentially around the cylindrical surface 70 from the major part of the fin 81 and from the edge 84. The "offset" between the edges 84 of the fins 80 and the edges 89 of the fins 81 is in the region of $\frac{1}{2}$" so that a line or net engaged by the fins 80,81 will be pulled by frictional contact down into the space between the edges 89,84 and the cylindrical surface 70 to follow a sinuous path around these edges. By positioning the fins 80,81 at an angle of 45° to the strictly radial plane passing through the shaft 74 the best compromise is achieved for the edges 85,90 of the fins 80,81 which smoothly merge with the frusto-conical surfaces 71,72 of the end flanges while at the same time defining elements of an engagement surface capable of supporting a net containing a large number of fish on the radially inner side of the annular space 73 between the flanges.

The integral cast construction of the drum makes it light in weight while the fins 80,81 are strong and robust, thickening at their root to merge with the cylindrical surface of the flanges at curved junctions as illustrated. For additional resistance steel rods may be let into the free edges 84,85 and 89,90 to act as wear resistant surfaces.

Figure 8:
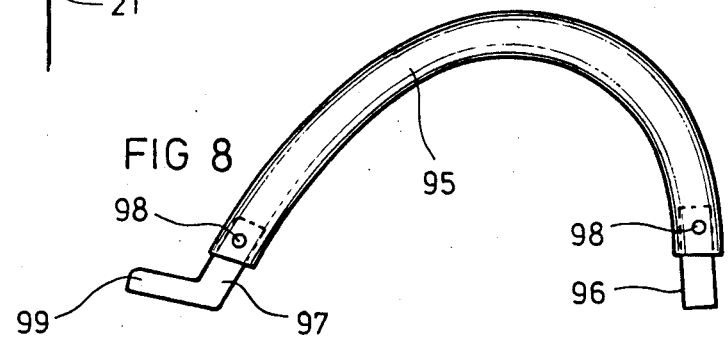
FIG. 8 is a plan view of a net guide constituting part of another embodiment of the invention.

FIG. 8 illustrates a further modification of the guide loop in which a length of flexible plastics material is used. Material such as 2" or 2$\frac{1}{2}$" polypropylene pipe has been found to be suitable. As can be seen from FIG. 8 the loop, generally indicated 95 is curved to an asymmetrical D-shape and has, fitted into each end, a length of solid steel rod 96,97. The rod 96 is secured in position in the end of the loop 95 by a roll pin 98, and the rod 96 is welded to a fixed part of the structure such as the upright carrying the spindle for the drum. The rod 97 is likewise fitted in the end of the pipe 95 by a roll pin 98 and the rod 97 has a transverse projection 99 extending generally in the plane of the loop and radially outwardly therefrom. A suitable strap is welded to the upright carrying one end of the drum spindle for engagement by the projection 99 which is held in position by the resilient flexibility of the material of the pipe 95. Being an otherwise unformed pipe curving it to the D-shape illustrated in FIG. 2 places it permanently in stress and therefore a force is continually exerted on the projection 99 urging it into close engagement with the strap retaining it on the upright. Should a large bulge in the net, due to an unexpectedly large number of fish or to an exceptionally large individual fish, which might threaten to jam in the loop 95 arise, it is only necessary to exert a sharp thrust on the end of the loop 95 bearing the projection 99 to disengage the projection 99 from the strap and allow the material of the loop 95 to spring outwardly to a generally straight or at least free open curve. As is known plastics materials tend to have only a limited degree of resilience so the pipe 95 will not in practice straighten entirely when released but will nevertheless be free to straighten allowing any large object to pass the loop onto the net hauler without damage.

Indeed, it is envisaged that the net guide such as that illustrated in FIG. 8, or such as that illustrated in FIG. 5 may be used with net hauling apparatus different from the specific net hauling apparatus disclosed herein. Indeed, any form of net hauling apparatus is subject to the same disadvantage that the modern multi-monofilament nets dry rapidly and can therefore readily be blown by even a light breeze into a billowing cloud of uncontrollable mesh likely to get trapped in the machinery of the net hauler unless guided to follow the required path.

The invention is thus considered to comprehend any form of net hauling apparatus in which a closed loop net guide is provided in advance of the net drawing equipment, which loop is provided with means for opening the loop to prevent damage occurring in the event of an excessively large net load.

I claim:

1. A line or net hauling apparatus comprising:
    a rotatable member,
    a generally cylindrical surface on said rotatable member,
    a plurality of generally radially projecting arms spaced around the periphery of said cylindrical surface, each said arm comprising a first part which extends substantially normal to said cylindrical surface and a second part which is joined to said first part at an elbow, the said first parts of the arms defining a sinuous path on the said cylindrical surface for a flexible member placed between them, and each said second part being inclined with respect to an axial diametral plane of said cylindrical surface in which the associated said first part lies, said second parts of adjacent arms lying on opposite sides of a central radial plane and at an angle thereto.

2. The apparatus of claim 1, wherein each said arm further has a third part lying at an angle to said central radial plane which is greater than the angle between said second part and said central radial plane.

3. The apparatus of claim 2, wherein said first parts of adjacent arms are spaced axially alternately on either side of a central radial plane passing through the cylindrical surface.

4. The apparatus of claim 3, wherein the axial spacing of each first part of adjacent pairs of arms is approximately equal to the thickness of said first part of the arm itself.

5. The apparatus of claim 2, wherein each said arm is positioned such that its first part lies on the opposite side of said central radial plane from that on which its second part lies.

6. The apparatus of claim 1, wherein the radially outer end of each said arm is supported against movement with respect to said cylindrical surface by a rigid support element of said rotatable member projecting radially therefrom.

7. The apparatus of claim 6, wherein the said rigid support element is a generally disc-like support element extending radially from said cylindrical surface.

8. The apparatus of claim 7, wherein said disc-like support element is substantially frusto-conical in form, with the wider end spaced axially from a central radial plane of the apparatus.

9. The apparatus of claim 7, wherein said cylindrical surface and said disc-like support elements are secured together to constitute said rotatable member.

10. The apparatus of claim 1 wherein there is further provided a net guide loop attached to said cradle in a position along the path followed by a net when it is being hauled by said apparatus and in advance of the region of contact between the net being hauled and said arms, said net guide loop having a smooth net guide surface with no projections and no moving parts capable of wear, whereby no surface discontinuites are presented to a net to be snagged thereby in passing through said loop.

11. The net hauling apparatus of claim 1, wherein the space between each said arm and said cylindrical surfaces is filled with a fin panel.

12. The apparatus of claim 1 wherein each said first and second part of a given arm defines a plane, and planes defined by said first and second parts of adjacent said arms lie substantially perpendicular to one another.

13. A line or net hauling apparatus comprising:
a rotatable member,
a generally cylindrical surface of said rotatable member,
a plurality of generally radially extending engagement members on said rotatable member, said engagement members having first surface elements projecting normally to said generally cylindrical surface and defining between them a sinuous path on said cylindrical surface for a flexible member placed between them, and
second surface elements defining two coaxial frusto-conical surfaces having a wide end and a narrow end, said coaxial frustoconical surfaces being positioned with said narrow ends directed towards one another, said engagement members being in the form of a plurality of fins each lying in a respective plane inclined with respect to both radial and axial planes of said cylindrical surfaces, said first and second surface elements being constituted by edge faces of said fins lying between two parallel major faces defining the plane of said fin, said edge faces constituting said second surface elements lying at an angle inclined to a diametral axial plane of said cylindrical surface.

14. The apparatus of claim 13, wherein said rotatable member includes a shaft borne in plain bearings in a cradle which is turnable about an upright axis.

15. The apparatus of claim 14, wherein there is further provided a net guide loop attached to said cradle in a position such that a net being hauled by said apparatus passes through said loop before contacting said rotatable member.

16. The apparatus of claim 15, wherein said net guide loop includes an opening closable by a closure member.

17. The apparatus of claim 15, wherein said net guide loop includes a generally linear portion and a curved portion.

18. The apparatus of claim 17, whrein said opening in said net guide loop is formed in said linear portion thereof and said closure is a cylindrical, at least partly resilient, sleeve over the loop.

19. The apparatus of claim 15, wherein there are further provided rear guard means lying in a plane generally parallel to the axis of said cylindrical surface and laterally displaced from the plane of said loop.

20. The apparatus of claim 13 wherein there is further provided a net guide loop attached to said cradle in a position along the path followed by a net when it is being hauled by said apparatus and in advance of the region of contact between the net being hauled and the said first and second surface elements, said net guide loop having a smooth net guide surface with no projections and no moving parts capable of wear, whereby no surface discontinuities are presented to a net to be snagged thereby in passing through said loop.

21. The apparatus of claim 13, wherein each said fin lies in a plane extending at generally 45° to a radial plane passing orthogonally through the axis of said cylindrical member.

22. The apparatus of claim 21, wherein said cylindrical surface is formed as part of a drum having generally radially extending end flanges formed as frusto-conical surfaces with their narrow ends directed towards one another and their wide ends remote from one another.

23. The apparatus of claim 22, wherein said drum is made as a unitary casting and said cylindrical surface is supported by a single radial web from a central shaft borne at its ends in plain bearings.

24. The apparatus of claim 23, wherein said frusto-conical end flanges of said drum are supported by generally radially extended reinforcement webs extending from said shaft to said frusto-conical surface itself.

25. The net hauling apparatus of claim 13, wherein said fins are reinforced at the free edges thereof with metal rod reinforcing elements.

* * * * *